(12) United States Patent  (10) Patent No.: US 9,203,228 B2
Holden et al.  (45) Date of Patent: Dec. 1, 2015

(54) ELECTRICAL WINDING AND TERMINATION INTERFACE

(75) Inventors: Gene Holden, Scottsdale, AZ (US); Jacob Harding, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1051 days.

(21) Appl. No.: 12/771,877

(22) Filed: Apr. 30, 2010

(65) Prior Publication Data

US 2011/0266401 A1  Nov. 3, 2011

(51) Int. Cl.
   *H02G 15/007* (2006.01)
   *B21C 47/02* (2006.01)
   *B21F 3/00* (2006.01)

(52) U.S. Cl.
   CPC .............. *H02G 15/007* (2013.01); *B21C 47/02* (2013.01); *B21F 3/00* (2013.01); *Y10T 29/49002* (2015.01)

(58) Field of Classification Search
   CPC ........... H02G 15/007; B21F 1/00; B21F 1/02; B21F 3/00; B21F 3/02; B21C 47/02; B21C 47/04; B21C 47/34
   USPC ......... 29/605, 606, 559, 592.1; 336/185, 196, 336/199, 207, 208, 221; 242/118.41, 171, 242/432.6, 433.4, 434.1, 615.4, 530, 548; 248/49
   See application file for complete search history.

(56) References Cited

U.S. PATENT DOCUMENTS

| | | | |
|---|---|---|---|
| 1,909,277 A | 5/1933 | Jamar, Jr. | |
| 2,368,025 A * | 1/1945 | Jamison | 493/328 |
| 2,375,309 A * | 5/1945 | McCoy | 336/208 |
| 2,416,297 A | 2/1947 | Finch et al. | |
| 2,604,275 A | 7/1952 | Hull | |
| 3,230,489 A * | 1/1966 | Weyrich | 336/192 |
| 3,460,247 A * | 8/1969 | Knutson | 29/605 |
| 3,605,055 A | 9/1971 | Grady | |
| 3,661,342 A * | 5/1972 | Sears | 242/118.41 |
| 3,787,792 A * | 1/1974 | DeJong et al. | 336/192 |
| 4,274,136 A | 6/1981 | Onodera et al. | |
| 4,352,079 A | 9/1982 | Mueller et al. | |
| 4,638,282 A | 1/1987 | Ellison | |
| 4,904,975 A | 2/1990 | Medenbach | |
| 5,105,531 A * | 4/1992 | Sawada et al. | 29/605 |
| 5,106,825 A * | 4/1992 | Mandigo et al. | 505/431 |
| 5,208,573 A * | 5/1993 | Nagaoka | 336/192 |
| 5,250,921 A * | 10/1993 | Van Laningham et al. | 335/296 |
| 6,055,720 A * | 5/2000 | Finn et al. | 29/605 |
| 6,344,787 B1 * | 2/2002 | McGrane et al. | 336/198 |
| 6,346,870 B1 * | 2/2002 | Bill et al. | 336/198 |
| 6,396,379 B1 * | 5/2002 | Kondo et al. | 336/208 |
| 7,249,728 B2 * | 7/2007 | Williamson | 242/566 |
| 7,498,709 B2 * | 3/2009 | Shteynberg et al. | 310/184 |
| 7,639,111 B2 | 12/2009 | Hsu et al. | |

(Continued)

*Primary Examiner* — Christopher M Koehler

(74) *Attorney, Agent, or Firm* — Ingrassia Fisher & Lorenz, PC

(57) ABSTRACT

Methods and devices are provided for supporting a wire having a minimum tolerable bend radius. The device comprises a core portion with a longitudinal axis supporting at least a first portion of the wire and a flange portion attached to the core portion supporting at least a second portion of the wire. The device has at least one hole with a first opening in the first surface defined by a first rim and a second opening in the second surface defined by a second rim. The hole allows the wire to pass through and also supports the wire. The hole is oriented in three dimensions to forestall a bend that may occur in the wire having a bend radius that is less than the minimum tolerable bend radius of the wire.

8 Claims, 5 Drawing Sheets

(56) References Cited

U.S. PATENT DOCUMENTS

| | | | |
|---|---|---|---|
| 7,669,315 B2* | 3/2010 | Kish | 29/755 |
| 2002/0075115 A1 | 6/2002 | Yeh et al. | |
| 2004/0212476 A1* | 10/2004 | Hsueh et al. | 336/208 |
| 2008/0104827 A1* | 5/2008 | Kish | 29/605 |
| 2010/0109827 A1* | 5/2010 | Asou et al. | 336/192 |
| 2011/0221562 A1* | 9/2011 | Tsai et al. | 336/221 |
| 2012/0023870 A1* | 2/2012 | Piascik et al. | 53/432 |

* cited by examiner

ELECTRICAL WINDING AND TERMINATION INTERFACE

TECHNICAL FIELD

The present invention generally relates to the winding and termination of electric devices, and more particularly relates to the winding and termination of electric devices using friable ceramic insulation.

BACKGROUND

An electric wire typically comprises a conductive material such as copper, silver, nickel, aluminum, gold, etc. that can withstand temperatures up to but less than its melting point. To avoid creating a short circuit between the conductive material and some other electrically conductive object (including itself), the conductive material is covered along its length in a sheath of an elastomeric insulating material such as rubber, plastic or other material. The elastomeric insulating material is typically pliable enough to allow the wire to be bent at an angle with a relatively small bend radius without rupturing, crumbling or otherwise breaching the insulation of the wire. However, in environments where the temperature is high (e.g. 600-1000° F.), an elastomeric insulator can breakdown or melt away potentially creating short circuits and increasing the likelihood of system malfunctions that result therefrom.

To operate in high temperature environments (e.g. 600-1000° F.), ceramic insulation material (e.g. zeolite) may be used. However, ceramic insulation tends to be friable and susceptible to flaking Wires protected by ceramic insulation cannot therefore tolerate bending where the bend radius is smaller than a predetermined minimum bend radius dictated by the ceramic insulation. Because of this limitation, it is difficult to manufacture some electrical devices that can operate in high temperature environments.

Of particular difficulty is the manufacture of wire coils such as inductors, electric motor windings, generator windings, linear variable differential transformers (LVDT), and the like. This is so due to the tight bends encountered in the manufacturing process while terminating a wire or supporting the wire during the winding process. Therefore, there is a need for devices and methods for terminating and supporting a wire without exceeding a minimum bend radius at any point along the wire.

Accordingly, it is desirable to develop devices and methods to facilitate the manufacture of electrical devices for use in high temperature environments. Specifically it is desirable to support ceramic-insulated wiring during the manufacturing process. Furthermore, other desirable features and characteristics of the present invention will become apparent from the subsequent detailed description of the invention and the appended claims, taken in conjunction with the accompanying drawings and this background of the invention.

BRIEF SUMMARY

An apparatus is provided for supporting a wire with a minimum tolerable bend radius. The apparatus comprises a means for providing substantially continuous physical support for the insulated wire along its entire length and a means for preventing a bend in the ceramic-insulated wire having a bend radius that is less than the minimum tolerable bend radius.

An apparatus is provided including a wire having a minimum tolerable bend radius and a device for supporting the wire. The device comprises a core portion supporting at least a first portion of the wire, the core portion having a longitudinal axis, and a flange portion attached to the core portion supporting at least a second portion of the wire. The flange portion having a first surface and a second surface. The surfaces further comprise at least one hole penetrating the flange portion. The hole has a first opening in the first surface defined by a first rim and a second opening in the second surface defined by a second rim. The hole allows the wire to pass through the flange and is oriented to forestall a bend in the wire with a bend radius that is less than the minimum tolerable bend radius of the wire.

A method is provided for supporting a wire with a minimum tolerable bend radius. The method comprises providing a support device that includes a core portion with a surface radius that is larger than the minimum tolerable bend radius of the wire and a flange portion encircling the core portion with a first surface and a second surface. The method further comprises creating at least one hole through the flange portion extending through the first surface and through second surface, the hole having a first rim defined by the first surface and a second rim defined by the second surface. The wire is then wrapped around the core portion adjacent to the first surface of the flange and run from the first surface of the flange portion to the second surface of the flange via a first hole of the at least one hole. The ends of the wire are then secured.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
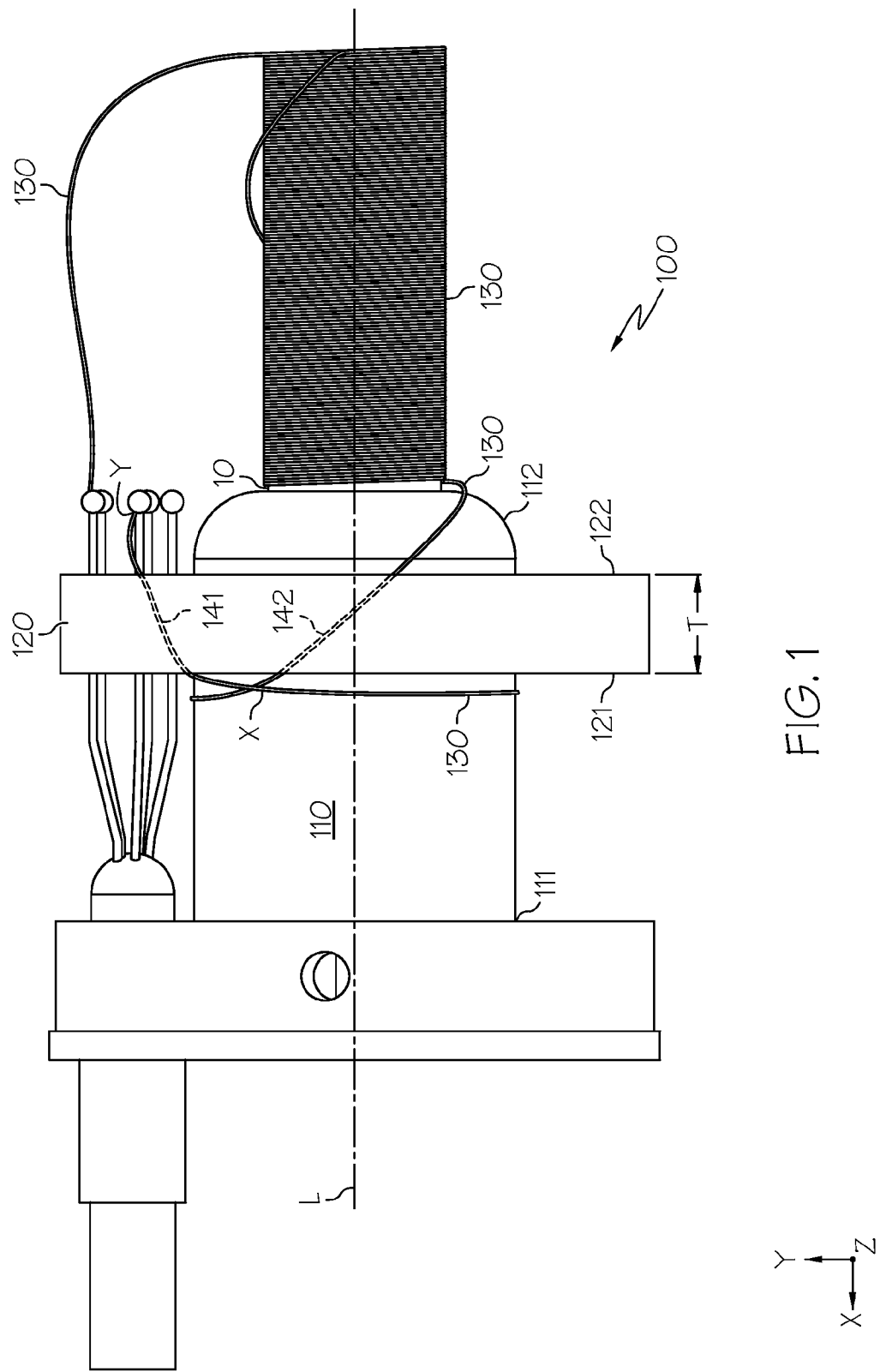
FIG. 1 is a side view of a device for facilitating the support and termination of a wire during manufacture.
Figure 2:
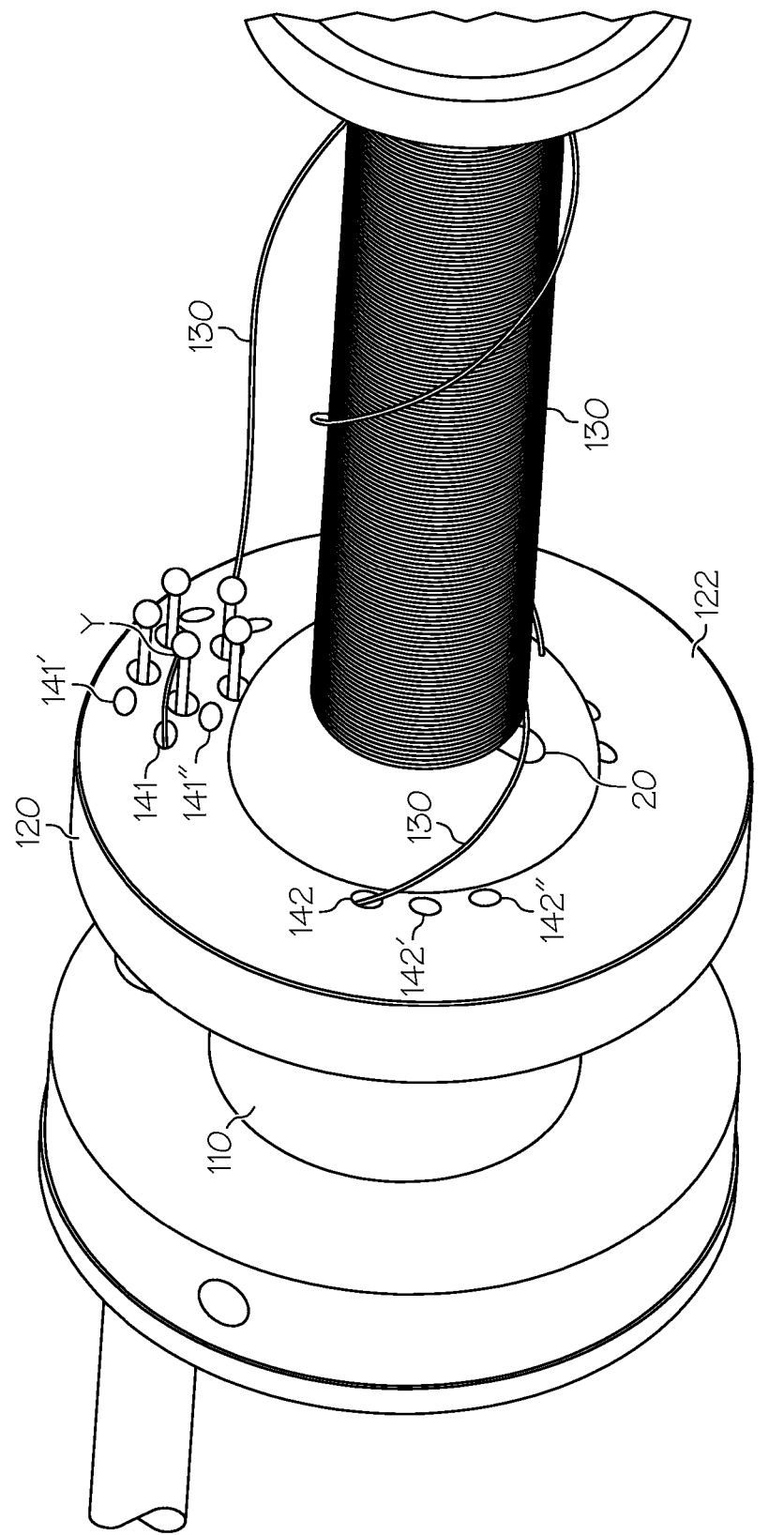
FIG. 2 is a first oblique view of the device for facilitating the support and termination of a wire during manufacture.
Figure 2:
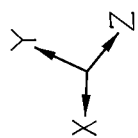
Figure 3:
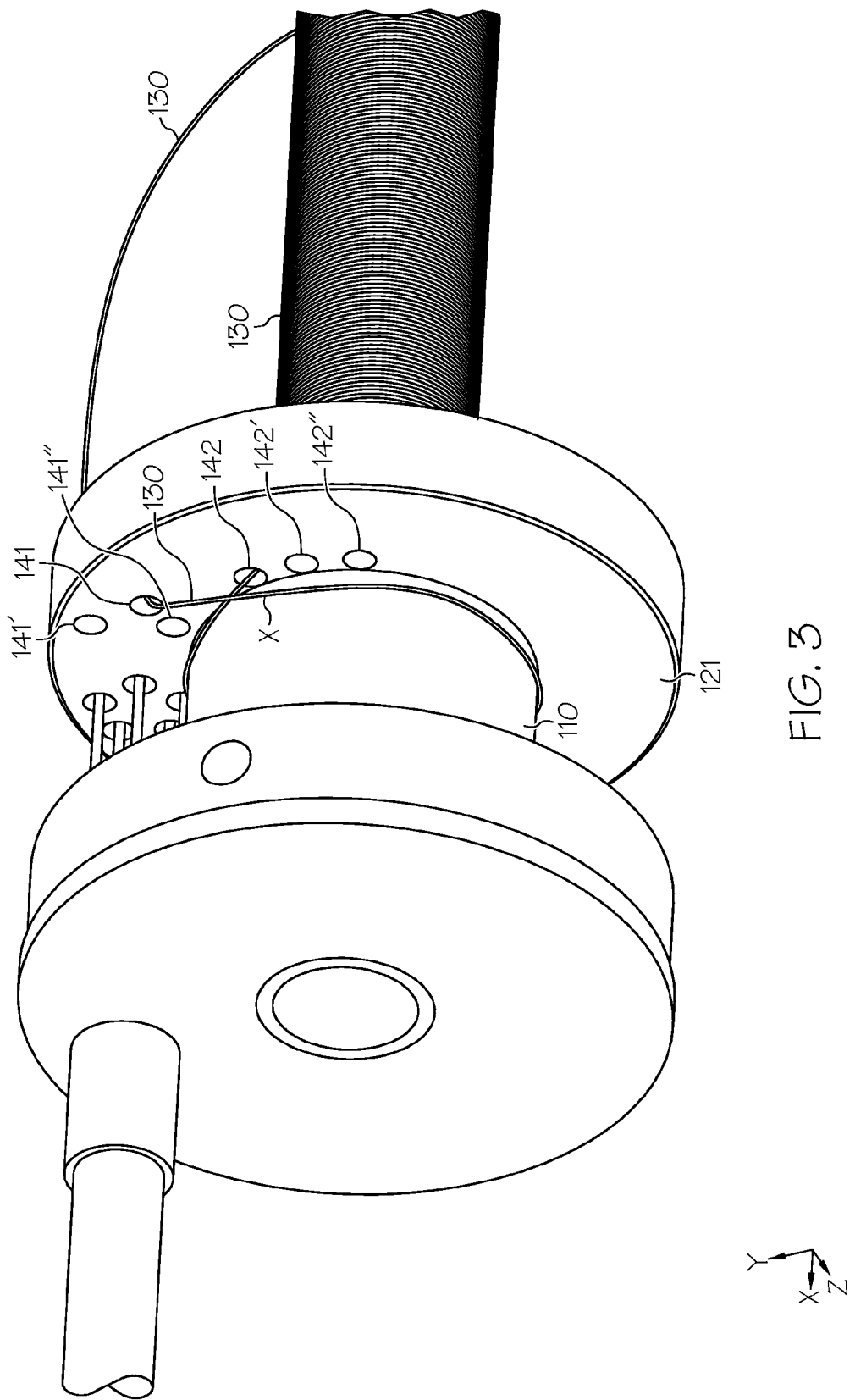
FIG. 3 is a second oblique view of the device for facilitating the support and termination of a wire during manufacture.

FIGS. 1-3 depict various views of an exemplary support device 100 that may be used to facilitate the termination of a ceramic-insulated wire 130 by supporting the wire along substantially its entire length and simultaneously eliminating any acute bends in the wire that may result in the flaking of the friable ceramic insulation. It will be appreciated by those of ordinary skill in the art that the methods and devices disclosed herein below may be applied to a single wire termination, a termination of a pair of ends of a coil during the coil manufacturing process, or a termination of a wire loop or other electric circuit.

The support device 100 comprises a core portion 110 and a flange portion 120. The core portion 110 may be a solid core in some embodiments or may be a hollow core in other embodiments. The core portion 110 may be of any suitable shape. As non-limiting examples, the core portion 110 may be a circular cylinder, an elliptical cylinder, or a polyhedral prism. No matter its shape, the core portion 110 includes a first end 111, a second end 112 and a longitudinal axis L. The core portion 110 may also be keyed 20 (See FIG. 2) to an adjacent device, such as a spindle 10 for a coil of the ceramic-insulated wire 130, in order to maintain relative angular position therewith.

As will be more fully described below, the ceramic-insulated wire 130 may be wrapped around the core portion 110 at least once. In order to prevent the flaking of the ceramic insulation of the wire 30, the radius of curvature of the core at any point on its surface is preferably greater than a minimum bend radius of the ceramic-insulated wire 130. Similarly, one of ordinary skill in the art will appreciate that if the core portion 110 is a polyhedral prism, the interior angles of the prism are preferably greater than the minimum bend radius R of the ceramic-insulated wire 130.

The flange portion 120 surrounds the core portion 110 at some point along the length of the longitudinal axis L of the core portion 110 and is integrally affixed thereto. The flange portion 120 may have any desired shape as may be found convenient in a particular application. In most embodiments the flange portion 120 is preferably annular with a first surface 121, a second surface 122, and a thickness T. Although the flange portion may be arranged in any suitable configuration relative to the core portion 110, in preferred embodiments the flange portion 120 is arranged at least substantially perpendicularly to the axis L.

The flange portion 120 may comprise one or more holes (141, 142) with each hole preferably associated with each ceramic-insulated wire 130 being supported or terminated thereby. The holes (141, 142) extend through the flange portion 120 between the first surface 121 to the second surface 122. The holes (141, 142) are also preferably oriented in three dimensions relative to the longitudinal axis L of the core portion 110 so as to eliminate any need to bend the ceramic-insulated wire 130 beyond the predetermined minimum bend radius as it passes through the holes 141 and 142 from one point of support to another.

For example, in FIG. 1 a first point of support on the core portion 110 may be point X. A second point of support may be point Y. Support point X may be the last point on the surface of the core portion 110 that contacts the ceramic-insulated wire 130. Support point Y may be an arbitrary point of termination of the ceramic-insulated wire 130. At point Y, the wire is brazed or otherwise connected to another component, lead or circuit. As such, the holes 141 and 142 are formed such that the wire segment between support points X and Y is not forced to assume a bend radius that is less than the minimum bend radius.

To ensure that no incidental shear stresses are experienced by the ceramic-insulated wire 130 that may result from an unacceptably acute bend, the rims of holes 141 and 142 that are bounded by the first surface 121 and the second surface 122 may be sculpted (i.e. shaped) to eliminate flange material that may result in the contortion of the ceramic-insulated wire 130. This is done by selectively removing flange material from the vicinity of the rims of holes 141 and 142 using a laser or other suitable technique known in the art. Each of the first rim and the second rim of the at least one hole is sculpted, which each of the sculpted first rim and the sculpted second rim have an radius of curvature that is greater than the minimum bend radius of the wire.

It will be recognized by those of ordinary skill in the art that the orientation of the holes 141, 142 may vary from one support device to another and from one size of the support device 100 to another in a given application. As such, there is no universal formulation for determining the a priori orientation of the holes (141, 142). One of ordinary skill in the art may determine the precise orientation and shouldering of the holes (141, 142) using routine design procedures and standard computer aided design (CAD) systems known in the art given the minimum bend radius of the ceramic-insulated wire 130 and the actual geometry of the support device 100.

Figure 4:
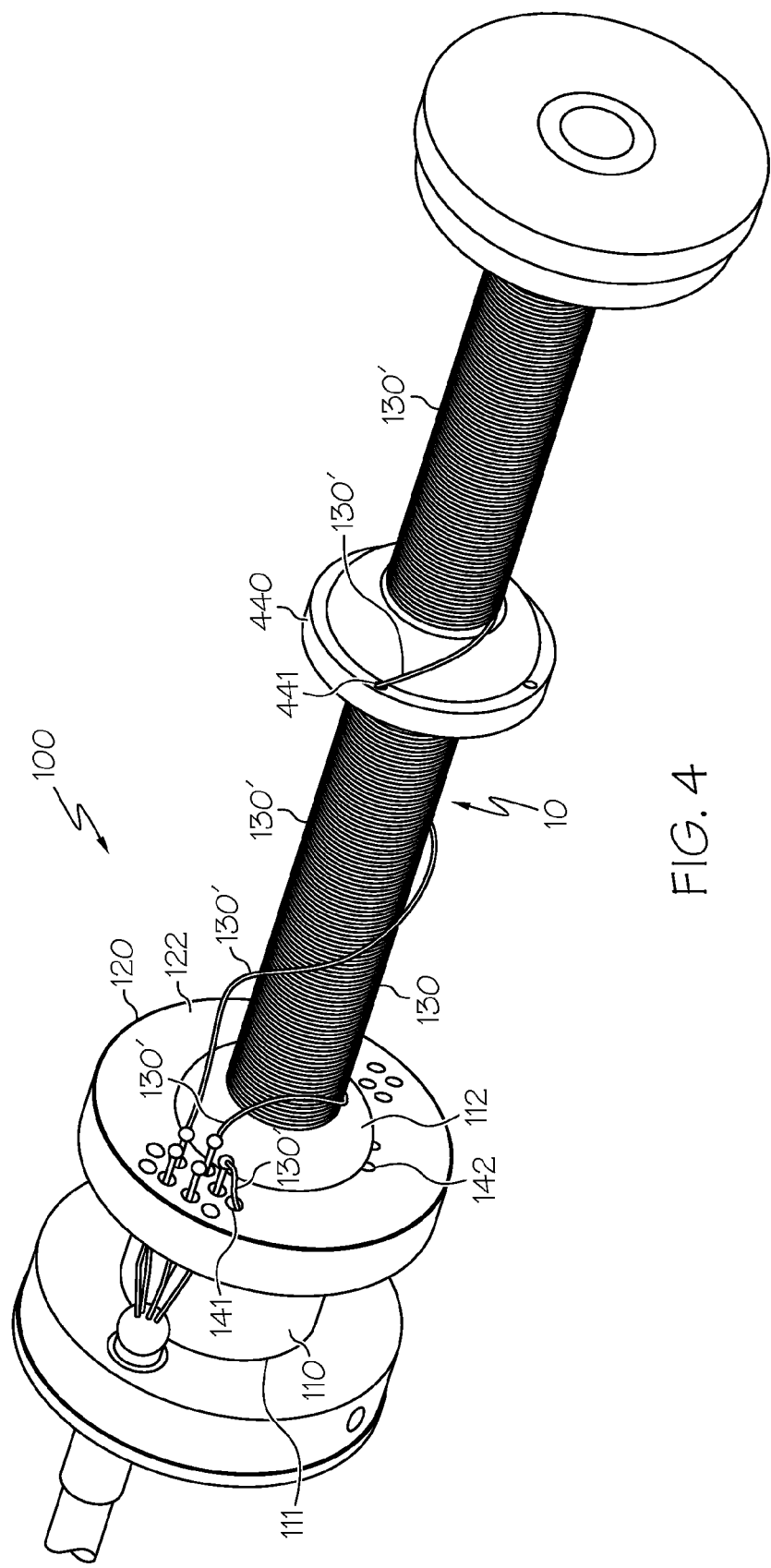
FIG. 4 is an illustration of the device terminating multiple wire coils.

FIG. 4 is a non-limiting example of an embodiment terminating multiple sets of ceramic-insulated wires 130, 131'. One of ordinary skill in the art will appreciate that multiple wires, or coils thereof, may be similarly terminated using a single support device 100. As such, a constellation of holes (e.g., 141, 141', 141", 142, 142', 142") may be formed through the flange portion 120 to accommodate multiple sets of wires. Because the physical geometry of the device and location of the ceramic-insulated wires 130 and 130' may be different, the holes formed for similar portions of the ceramic-insulated wires 130 and 130' may differ from each other. However, in some embodiments, it may be convenient that multiple wires share a properly sculpted hole through the flange portion.

In FIG. 4, only one additional wire 130' is shown in the interest of clarity of explanation. However, there may be any number of wires terminated in the same manner. In the non-limiting embodiment of FIG. 4, ceramic-insulated wires 130 and 130' are separated by a spacer 440. Spacer 440 may have a hole 441 formed therethrough in the same manner as holes 141, 141' 141", 142, 142' and 142" in order to prevent a bend in the ceramic-insulated wire 130' that is less than the minimum bend radius of ceramic-insulated wire 130'. The ceramic-insulated wire 130' does not have to be the same type of wire as ceramic-insulated wire 130 and therefore may have a different minimum bend radius than the minimum bend radius of ceramic-insulated wire 130. However, in preferred embodiments both ceramic-insulated wires 130 and 130' may be wrapped around the same core portion 110. As such, the radius of curvature of the surface of the core portion 110 is preferably greater than both (i.e. all) of the minimum bend radii of the ceramic-insulated wires 130 and 130'.

Figure 5:
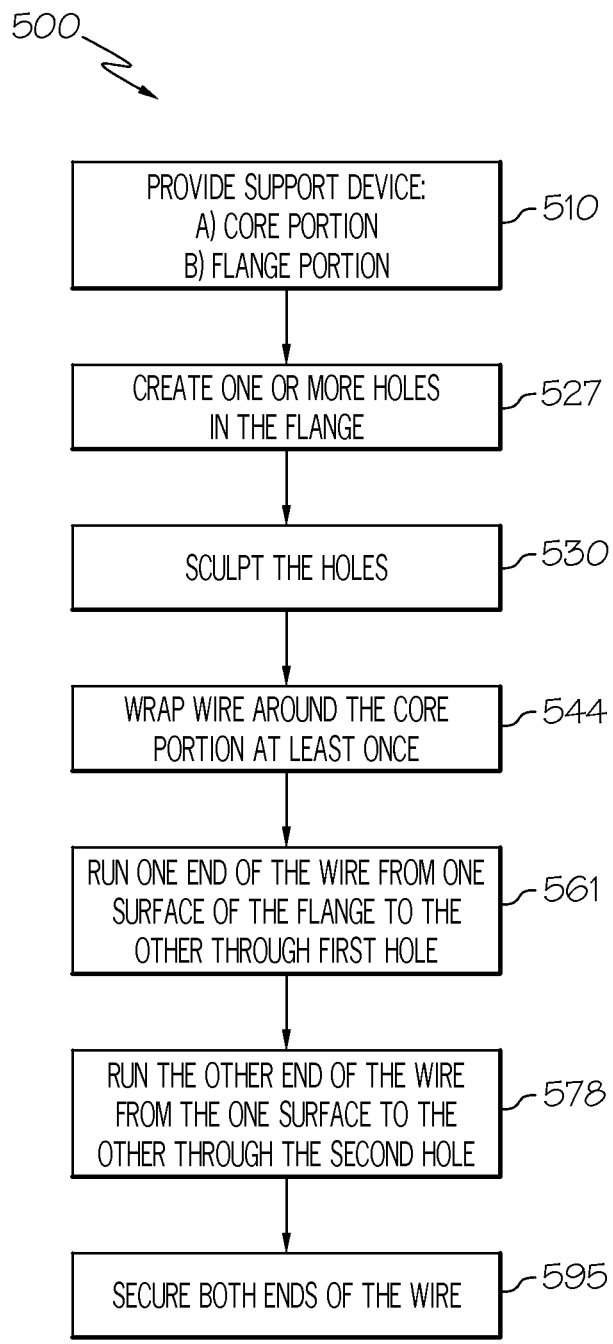
FIG. 5 is a flow chart for a method for facilitating the support and termination of a wire during manufacture.

FIG. 5 is a functional block diagram illustrating a method 500 for facilitating the termination of, and providing a constant surface for support for, the ceramic-insulated wire 130. One of ordinary skill in the art will appreciate that steps of the following method 500 may be consolidated in to fewer processes, separated into additional sub-processes or be accomplished in a different order and still conform to the scope and spirit of the disclosure provided herein.

The method 500 begins at process 510 where the support device 100 as described herein above is provided. At process 527, a one or more holes (141, 142) is created through the flange portion 120 by a laser drill or other suitable penetration means known in the art. The holes (141, 142) may be oriented at an angle in any of the three dimensions relative to the longitudinal axis L of the core portion 110 as may be found convenient based at least on the size and geometry of the device being manufactured. The rims of the holes 141, 142 in the first surface 121 of the flange portion and the second surface 122 of the flange portion 120 may also be placed in locations that minimize any portion of the ceramic-insulated wire 130 that may not have direct support from the surface of the core portion 110 or a hole (141, 142).

At process 530, the first rim and the second rim of the holes 141 and 142 are sculpted. Sculpting the rims alleviates any shear forces that may be caused by the ceramic-insulated wire 130 being pressed against an acute angle created between either of the first surface 121 and the second surface 122 of the flange portion 120 and the inside surface of the holes 141 or 142. Each of the first rim and the second rim of the at least one hole is sculpted. Each of the sculpted first rim and the sculpted second rim will then have a radius of curvature that is greater than the minimum tolerable bend radius of the wire.

Shear forces, if left unaddressed, may cause undesirable spalling of the ceramic insulation at that point due to vibrational friction and/or by the accidental creation of a bend radius that is less than the minimum tolerable bend radius.

At process 544, the ceramic-insulated wire 130 may be wrapped around the core portion 110 at least once. This process 544 is accomplished to 1) provide a continuous support surface for that portion of the ceramic-insulated wire 130, 2) provide an anchor for the balance of the wire during a subsequent manufacturing step (e.g. winding a coil), 3) forestall any bends in that particular portion of the wire that could have a bend radius less than the minimum tolerable bend radius, and 4) provide extra slack at one end of the ceramic-insulated wire 130, if such slack should be desired.

At process 561, one end of the ceramic-insulated wire 130 is run through one of the holes 141 or 142 from the first surface 121 to the second surface 122. At process 578, the other end of the wire is run through the other of the holes 141 or 142 from the first surface 121 to the second surface 122.

Alternatively, a portion the ceramic-insulated wire 130 may be drawn through one of the holes (141, 142) from the second surface 122 to the first surface 121, wrapped around the core portion 110 one or more times and then run through the other hole (141, 142) from the first surface to the second surface. The actual procedure is chosen based on the length of the wire and the subsequent manufacturing procedure(s) (e.g. winding or termination).

At process 595, both ends of the wire are electrically terminated by means known in the art after any subsequent manufacturing procedures are completed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A device comprising:
a wire having a minimum tolerable bend radius;
a core portion supporting at least a first portion of the wire, the core portion having a longitudinal axis;
a flange portion attached to the core portion supporting at least a second portion of the wire, the flange portion having a first surface and a second surface; and
first and second holes penetrating the flange portion, the first and second holes each having a first opening in the first surface defined by a first rim and a second opening in the second surface defined by a second rim, the first and second holes allowing the wire to pass therethrough and being oriented to forestall a bend in the wire with a bend radius that is less than the minimum tolerable bend radius of the wire,
wherein:
the wire extends from a first side of the flange portion, through the first hole, to the opposing side of the flange portion, and through the second hole to return to the first side of the flange portion whereat the wire is joined to a support point of the device,
an entirety of the first and second holes penetrating the flange portion is not oriented parallel to the longitudinal axis of the core portion, and
the first rim and the second rim of the first and second holes are each sculpted to have a radius of curvature that is greater than the minimum tolerable bend radius of the wire.

2. The device of claim 1, wherein the wire is a coil.

3. The device of claim 1 wherein a surface radius of the core portion is greater than the minimum tolerable bend radius of the wire.

4. The device of claim 1, wherein the flange portion is fixedly attached to the core portion.

5. The device of claim 1, wherein the flange portion is integral with the core portion.

6. The device of claim 1, wherein the flange portion is always stationary relative to the wire and to the core portion.

7. The device of claim 1, wherein the core portion is stationary relative to the flange and to the wire.

8. The device of claim 1, wherein the flange portion is directly attached with the core portion.

* * * * *